United States Patent [19]

Akiyama et al.

[11] Patent Number: 4,657,285
[45] Date of Patent: Apr. 14, 1987

[54] TUBULAR RUBBER PRODUCTS

[75] Inventors: Setsuo Akiyama, Higashimurayama; Yukio Fukuura, Kawagoe; Masato Yoshikawa, Tokyo; Takeyuki Matsuda; Hisanobu Monobe, both of Yokohama; Shigeki Ohkubo, Yokosuka; Shiro Yoshida, Yokohama, all of Japan

[73] Assignee: Bridgestone Corporation, Tokyo, Japan

[21] Appl. No.: 669,845

[22] Filed: Nov. 9, 1984

[30] Foreign Application Priority Data

Nov. 22, 1983 [JP] Japan .................. 58-220095

[51] Int. Cl.$^4$ ........................................... F16L 33/00
[52] U.S. Cl. ............................. 285/256; 138/103; 138/109; 138/137; 156/187; 156/281; 156/307.3; 156/331.2; 156/335; 285/239; 285/259; 427/412.1
[58] Field of Search .................. 156/187, 335, 307.3, 156/331.2, 281; 427/412.1; 138/103, 137, 109; 285/239, 256, 259

[56] References Cited

U.S. PATENT DOCUMENTS

| | | | |
|---|---|---|---|
| 3,017,203 | 1/1962 | Macleod | 285/256 |
| 3,210,100 | 10/1965 | Lowles et al. | 285/259 |
| 3,234,067 | 2/1966 | Krysiak | 156/335 |
| 4,251,409 | 2/1981 | Neubert | 156/335 |

FOREIGN PATENT DOCUMENTS

| | | | |
|---|---|---|---|
| 37-6972 | 3/1962 | Japan | 427/412.1 |
| 771120 | 3/1957 | United Kingdom | 427/412.1 |

Primary Examiner—John J. Gallagher
Attorney, Agent, or Firm—Birch, Stewart, Kolasch and Birch

[57] ABSTRACT

A process for producing a tubular rubber product such as a rubber hose and a rubber coupling in which a polyamide resin and/or polyester resin layer is formed to the main body of a tubular rubber product. The resin layer is formed either by coating an organic solvent-soluble nylon to the surface of the main body of the tubular rubber product applied with the surface treatment of a halogenoid compound, or by polyamide resin or by polyester resin film having a softening point in the vulcanization temperature region and treated with an adhesive mainly comprising a resorcine-formaldehyde resin and a rubber latex or treated with an adhesive rubber mainly comprising a resorcine, a formaldehyde-forming substance and a vinylpyridine-butadiene-styrene copolymer rubber and then bonding under vulcanization onto the main body of the non-vulcanized tubular rubber product.

12 Claims, 7 Drawing Figures

TUBULAR RUBBER PRODUCTS

BACKGROUND OF THE INVENTION

This invention concerns a process for producing a tubular rubber product such as rubber hose, rubber coupling and the like laminated with a synthetic resin layer and, more specifically, it relates to a process for producing a tubular rubber product having a polyamide resin and/or polyester resin layer laminated thereon as a synthetic resin layer.

The surface of rubber is not always sufficiently resistant to chemicals such as organic solvents and, accordingly, with an aim of improving the organic solvent-resistance of rubber, various methods have hitherto been employed including, for instance, (1) use of rubber material with the different polarity from that of the solvents, (2) increasing in the cross-linking rate of rubber, (3) increasing the amount of filler and (4) increasing the amount and the thickness of the rubber employed.

However, these methods suffer from the following drawbacks respectively. Specifically, the method (1) requires expensive rubber such as chloroprene rubber (CR), butadiene-acrylonitrile rubber (NBR), acrylic rubber, epichlorohydrin rubber and fluorine rubber. The method (2) results in a problem of impairing the flexibility or the flexion resistance of rubber and the effect itself on improving the organic solvent-resistance is not so excellent. The method (3) has an upper limit for the filler amount in view of the workability and the physical properties of the rubber and it can provide an improving effect for the organic solvent resistance only in proportion to the volume fraction of the filler. Furthermore, the method (4) has a problem in that increasing in the thickness cause an increase in the weight of the product which results in increasing the cost and impairing the flexibility of the product.

In addition, the rubber material has a low resistance to gas permeation. As compared with 6-nylon, the permeation resistance to $O_2$ and $N_2$ is about 1/30–40 for isobutylene isoprene copolymer rubber (IIR) which is considered to have the most desirable permeation resistance among various rubbers and are as low as about 1/500–1/600 for butadiene rubber (BR).

Furthermore, another problem is that the rubber material is blended with various chemicals such as aging stabilizers, vulcanizers, vulcanization promoters and oils, and they are partially leached out of rubber material under certain conditions which circumstances deteriorate the rubber properties.

In addition, since the surface of rubber has a large frictional coefficient, its results in a large flow resistance to a fluid flowing thereover. Undesirable pressure loss occurs while the fluid moves through the inside of tubular rubber products. Therefore, it is desired to reduce friction on the rubber surface in order to overcome the foregoing problem.

The various problems involved in the rubber material as described above, also occur in tubular rubbery products such as rubber hoses, rubber couplings and the like.

Rubber hoses have a wide variety of uses such as for automobile fuels, air conditioners, refrigerators, propane gases, hydraulics, as well as domestic uses, and various fluid medium are passed through the hoses such as organic solvents or gases as well as water and oils. Thus, although it is desirable for the rubber hoses that to have acceptable low resistance to the fluid mediums, high flexibility, excellent low temperature properties, as well as being excellent in the matching performance with metal caps and inexpensive in cost, conventional rubber hoses do not always satisfy the foregoing requirements.

SUMMARY OF THE INVENTION

Accordingly, the object of this invention is to provide tubular rubber products such as rubber hoses, rubber couplings and the like having excellent features capable of providing, for instance:
(1) significant improvement in the solvent-resistance for oil-resistant rubber,
(2) solvent-resistance for non oil-resistant rubber,
(3) improvement in the gas permeation resistance of rubber,
(4) preventive effect for the leaching of chemicals blended to rubber,
(5) reduction in the frictional coefficient at the surface of rubber,
(6) no substantial impairement in the flexibility of rubber products and
(7) improvement in the weather-resistance and aging resistance of rubber.

In order to attain the foregoing object, this invention provides a process for producing a tubular rubber product in which a polyamide resin and/or polyester resin layer is formed to the main body of a tubular rubber product.

The configuration of tubular rubber products such as rubber hoses and rubber couplings according to this invention include those in which the resin layer is formed on the inner circumferential surface of the tubular rubber product, those in which the resin layer is formed on the outer circumferential surface of the tubular rubber product, and those layered structures in which the resin layer is formed on the outer circumferential surface of an inner rubber tube and an outer skin rubber is further coated thereover, as well as those of the composite structures of the three types as described above.

A preferred embodiment according to this invention provides a process for producing a tubular rubber product which comprises applying a coating of an organic solvent-soluble nylon solution onto a rubber surface region prepared by treating the vulcanized or non-vulcanized surface with a halogenoid compound for modification and evaporizing the solvent to form a nylon coating layer on the rubber surface. Specifically, a nylon-coated tubular rubber product having an excellent bondability of the nylon coating layer to the tubular rubber product main body and with excellent properties as described above while enjoying the effect of the nylon layer to an utmost degree by forming a thin layer of organic solvent-soluble nylon of less than 500 $\mu$ thickness to the surface of rubber treated with the halogenoid compound can be obtained. On the contrary, no sufficient effect can be obtained when tubular rubber products are produced by merely treating the surface of rubber with the halogenoid compound or by merely forming the thin nylon layer on the surface of rubber without applying the halogenoid compound treatment.

Another preferred embodiment according to this invention provides a process for producing tubular rubber products which comprise laminating the resin film, which will be described below, to the surface of the main body of a non-vulcanized tubular rubber product, and then applying vulcanization to bond the film to the main body. It is advantageous to use a polyamide resin or polyester resin film having a softening point in the vulcanizing temperature range. The resin film is treated with an adhesive mainly comprising a resorcin-formaldehyde resin and a rubber latex or with an adhesive rubber mainly comprising a resorcin, a formaldehyde-forming material and a vinylpyridine-outadiene-styrene copolymer rubber. The tubular rubber product thus prepared has the excellent properties as described above with the bondability of the synthetic resin film layer to the tubular rubber product main body being excellent.

Referring more specifically with respect to the above, the polyamide or polyester resin has an excellent resistance to various solvents, particularly, organic solvents or aqueous alkaline solutions, and can provide excellent solvent-resistance both to oil-resistant rubber and non oil-resistant rubber. Furthermore, since the resin layer has a more dense structure and less gas permeation as compared with the rubber, the gas permeation resistance at the surface of rubber can significantly be improved by the formation of the resin layer according to this invention. The resin layer is also excellent in chemical resistance and, by forming the resin layer on the surface of the rubber according to this invention, external leaching of chemicals blended with rubber can be prevented to avoid the contamination of solution or gas surrounding rubber. Furthermore, since the resin layer has a lower frictional coefficient as compared with that of rubber, the frictional coefficient at the rubber surface can be reduced. The tubular rubber product having the foregoing excellent function can be obtained for the first time according to this invention by coating, on the rubber surface treated with a halogenoid compound, an organic solvent-soluble nylon solution and evaporizing the solvent to form the nylon layer or by laminating, onto a non-vulcanized tubular rubber product main body, a polyamide resin or polyester resin film having a softening point in a vulcanizing temperature region and treated with an adhesive mainly comprising a resorcin-formaldehyde resin and a rubber latex or an adhesive rubber mainly comprising a resorcin, a formaldehyde-forming substance and a vinyl pyridine-butadiene-styrene copolymer rubber, followed by bonding through vulcanization, whereby it has been found that the close bondability between the rubber surface and the resin layer can be significantly improved to develop the performance of the resin layer to the utmost degree.

The above and other objects, features, and advantages of this invention will be more fully understood by reading the following description.

DETAILED EXPLANATION OF THE INVENTION

The process for producing a tubular rubber product according to this invention comprises forming a polyamide resin and/or a polyester resin layer to a tubular rubber product main body.

Figure 1:
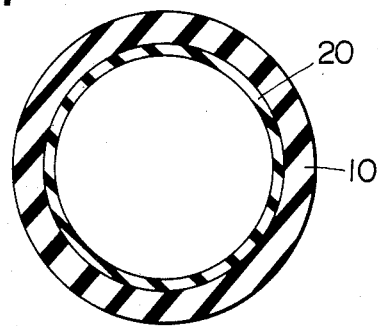
FIG. 1 to FIG. 3 are cross sectional views respectively showing one embodiment of tubular rubber product according to this invention.
Figure 2:
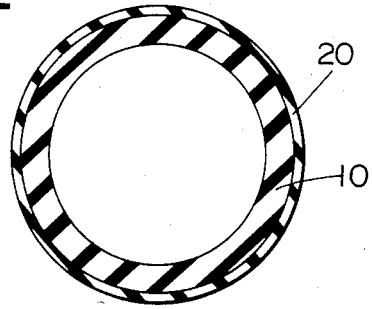
Figure 3:
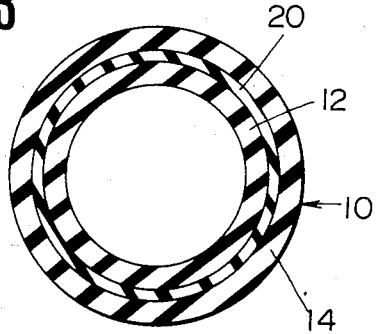

The resin layer can be formed as an inner circumferential surface, an outer circumferential surface or an intermediate layer to the tubular rubber product main body. FIGS. 1 to 3 show the respective cases, in which a resin layer 20 is formed on the inner circumferential surface of a tubular rubber product main body 10 in FIG. 1; a resin layer 20 is formed at the outer circumferential surface of the tubular rubber product main body 10 in FIG. 2; and a tubular rubber product main body 10 is formed with an inner tube 12 and an outer tube 14 and a resin layer 20 is formed between the inner tube 12 and the outer tube 14 in FIG. 3.

In this case, rubber constituting the tubular rubber product main body is selected depending on the purposes of use and kinds of the product to be produced. The rubber ingredients usable herein include natural rubber (NR), as well as a blend of one or more of synthetic rubbers having carbon-carbon double bonds in the structural formula. The synthetic rubber includes polyisoprene rubber (IR), polybutadiene rubber (BR), polychloroprene rubber as the homopolymer of conjugated diene compounds, for example, isoprene, butadiene and chloroprene; styrenebutadiene copolymer rubber (SBR), vinylpyridine-butadienestyrene copolymer rubber, acrylonitrile-butadiene copolymer rubber, acrylic acid-butadiene copolymer rubber, methacrylic acid-butadiene copolymer rubber, methyacrylatebutadiene copolymer rubber, methylmethacrylate-butadiene copolymer rubber or the like which is the copolymer of the conjugated diene compounds as described above and vinyl compounds such as styrene; acrylonitrile, vinylpyridine, acrylic acid, methacrylic acid, alkyl acrylates, alkyl methacrylates or the like; isobutylene isoprene copolymer rubber (IIR) or the like which is the copolymer of diene compound and olefins such as ethylene, propylene, isobutylene or the like; ethylenepropylene-cyclopentadiene ternary copolymer, ethylenepropylene-5-ethylidene-2-norbornane ternary copolymer, ethylenepropylene-1,4-hexadiene ternary copolymer or the like which is the copolymer of non-conjugated diene compound and olefins (EPDM); polypentenomer which is the polyalkenomer obtained through ring opening polymerization of cycloolefins; and sulfur vulcanizable polyepichlorohydrin rubber or polypropylene oxide rubber prepared through the ring opening polymerization of oxirane rings. Halogenated compounds for each of the rubbers, for example, chlorinated isobutylene isoprene copolymer rubber (Cl-IIR), brominated isobutylene isoprene copolymer rubber (Br-IIR) are further included and ring opening polymer of norbornane can also be used. Furthermore, as blend rubber, those prepared by blending the above-mentioned rubber with saturated elastomer such as epichlorohydrin rubber, polypropylene oxide rubber, chlorosulfonated polyethylene can also be used.

The rubber according to this invention can be blended as desired with fillers such as carbon black, silica, calcium carbonate, calcium sulfate, clay, diatomaceous earth and mica, softening agents such as mineral oils, vegetable oils and synthetic plasticizers, vulcanization promotor such as stearic acid, aging stability, cross-linking agent and accelerator.

The tubular rubber product according to this invention comprises a tubular rubber product main body composed of the above-mentioned rubber composition and polyamide resin or polyester resin layer formed thereover, in which the resin layer is preferably formed as a coated layer of an organic solvent-soluble nylon, or as a laminated layer of a polyamide resin or polyester resin film.

In the case of forming a coating layer of the nylon to the tubular rubber product main body, it is effective to apply a surface treatment by using a halogenoid compound to the rubber surface and coating the solution of an organic solvent-soluble nylon to the thus treated rubber surface and then evaporating the solvent to form a nylon coating layer. In this case, the rubber treated with the halogenoid compound and then formed with the nylon coating layer may be vulcanized or non-vulcanized rubber. That is, those rubber materials, prepared from the above-mentioned rubber ingredients and desired additives blended therewith by sufficiently kneading them in a kneader, or the blend thus prepared and then vulcanized under appropriate vulcanizing conditions can be used. The nonvulcanized rubber is vulcanized at the final stage.

The vulcanized rubbers include, in addition to sulfur vulcanized rubber, also includes all of those obtained through vulcanization of an organic sulfur compound such as dithiomorphorine, thiuram, peroxide quinoid, resin, metal salt, metal oxide, polyamide, radiation, hexamethylenetetramine or the like.

The halogenoid compound used for the treatment to the rubber surface includes, for example, halogenated isocyanate, N-monohaloalkyl urethane, N,N-dihaloalkyl urethane, N,N-dihaloallylsulfon amide, halogenated sulfur sulfenil halide, halomethyl ether, thiocyanogen, iodized azide, brominated azide, chlorinated iodine, brominated iodine, trichloro acetic acid iodide, acetic acid bromide, nitric acid iodide, alkyl hypohalide, alkylthionyl chloride, allylthionyl chloride, chlorinated nitrosyl, brominated nitrosyl, halogenated isocyanuric acid, halogenated methyl hydantoin or the like. Among them, halogenated isocyanate, N,N-dihaloalkyl urethane, N,N-dihaloallylsulfone amide, alkylhypohalide, halogenated isocyanuric acid, halogenated methyl hadantoin or the like are particularly suitable to the purpose of this invention in view of the performance, workability in the procession and safety.

They include, specifically, those compounds such as iodized isocyanate, N,N-dichloroethyl urethane, N,N-dibromoethyl urethane, N,N-dichloropropyl urethane, N,N-dibromopropyl urethane, N,N-dichlorobenzyl urethane, N,N-dibromobenzyl urethane, N,N-dichloro-p-toluene sulfone amide, N,N-dibromotoluene sulfone amide, N,N-dichlorobenzene sulfone amide, N,N-dibromobenzene sulfon amide, tertiary butyl hypohalide, trichloroisocyanuric acid, dichloroisocyanuric acid, dibromodimethyl hydantoin, dichlorodimethyl hydantoin dichloromethylisobutyl hydantoin, dichloromethylhexyl hydantoin or the like.

In the actual treatment, the halogenoid compound is used as a solution in an appropriate solvent usually at a concentration of 0.1–20% by weight and, preferably, 0.5–15% by weight. Specific example of the solvent can include halogenated hydrocarbons such as carbon tetrachloride, chloroform and dichloromethane; aromatic hydrocarbons such as benzene, nitrobenzene, halogenated benzene, toluene and xylene; chained or ring ether such as dimethyl ether, diethyl ether, tetrahydrofuran (THF) and dioxene; ester such as ethyl acetate; aliphatic hydrocarbons such as pentane, hexane, heptane, octane and cyclohexane; ketones such as acetone, cyclohexanone and methyl ethyl ketone; and alcohols such as ethanol, ethylene glycol and tertiary butyl alcohol. Among all, tetrahydrofurane, dioxane, acetone, benzene, toluene, carbon tetrachloride, chloroform, methyl ethyl ketone and ethyl acetate are particularly preferred for use.

Treatment for the surface of non-vulcanized or vulcanized rubber with the halogenoid compound can be carried out by any of methods that can contact the rubber surface with the halogenoid compound, including such as coating by using paint brush or brush, spraying, dipping and charging and discharging of a halogenoid compound solution through the inside of a tubular body. The treatment by the solution of the halogenoid compound can be carried out sufficiently at about room temperature and for 30 to 60 sec.

In the case of coating the solvent solution of an organic solvent-soluble nylon to the surface of nonvulcanized or vulcanized rubber treated with the halogenoid compound to form a membrane of the nylon solution, any of those nylons soluble to the organic solvent can be used including nylon-6, 11, 12, 66 and 610, copolymers or blends thereof and the polyamides thereof in which functional groups are partially modified. As the solvent, alcohols such as methanol, ethanol and the like can be used solely or incorporated with an appropriate amount of another solvent or further incorporated with calcium chloride or the like. Furthermore, formic acid or the like can also be used as the solvent.

In the case of dissolving the nylon into the solvent, the concentration is preferably between 0.1–30% by weight and, particularly, 0.3–15% by weight while dependent on the required film thickness of the coating, etc.

Further, plasticizer, coloring agent or crosslinker, etc. may be added as required to the nylon solution.

There is no particular restriction to the method of coating the nylon solution to the surface of rubber treated with the halogenoid compound, but any method capable of contacting the rubber surface with the nylon solution can be used including, for example, coating with a brush, spraying, dipping, and charging and discharging of a nylon solution to the inside of a tubular body.

After coating the nylon solution, the solvent is evaporated to form the nylon coating layer. In this case, although the solvent can be evaporated to form the nylon coating layer on the rubber surface by exposure to room temperature, it is preferred to apply heat, or pressure reduction solely or in combination. In the case where the solution of organic solvent-soluble nylon having a crosslinkable functional group is incorporated with a heat-crosslinking agent or a UV-crosslinking agent, crosslinking is attainable by applying heat in the evaporation step or further continuing the heating thereafter for the heat crosslinking agent and by irradiation using UV-rays during or after the film forming for the crosslinking agent.

The thickness for the nylon coating layer can be adjusted to less than 500 μm, preferably 10–100 μm by properly varying the concentration of the nylon solution, and the number of times for applying the coating.

After the surface of the non-vulcanized or vulcanized rubber is treated with the halogenoid compound, the organic solvent-soluble nylon solution is coated on the thus treated surface and the solvent is evaporated to form a nylon coating layer, and then the nylon-coated tubular rubber product thus obtained has an excellent bondability of the nylon coating layer to the rubber. The present process can, therefore, be used in the nylon coating treatment to the inner surface of hoses with the foregoing excellent effects.

In the case of forming a polyamide resin film or polyester resin film on the main body of the tubular rubber product, it is advantageous to use a polyamide resin film or polyester resin film having a softening point within the vulcanizing temperature region. The resin film is treated with an adhesive mainly comprising a resorcine-formaldehyde resin and a rubber latex or an adhesive rubber mainly comprising a resorcine, a formaldehyde-forming substance and a vinyl-pyridine-butadiene-styrene copolymer rubber and the thus treated resin film is laminated onto a non-vulcanized tubular rubber product main body, followed by bonding under vulcanization. Specifically, the main body of the tubular rubber product is treated either by a wet adhesion treatment of previously immersing a polyamide resin film or a polyester resin film which has an excellent permeation resistance to organic solvent or gas and is softened near the vulcanizing temperature region between 120°-200° C. in an adhesive mainly comprising a resorcine-formaldehyde resin and a rubber latex (hereinafter referred to as RFL) followed by drying or by a dry adhesion treatment of laminating, onto the above-mentioned resin film, an adhesive rubber mainly comprising a vinyl-pyridinebutadiene-styrene copolymer rubber, a resorcine and a formaldehyde-forming substance (for instance, hexamethylene tetramine). The treated resin film is laminated onto the tubular main body of non-vulcanized rubber and then bonded through vulcanization, whereby a laminated tubular rubber product with satisfactory bonding between the resin film and the rubber can be obtained. The tubular rubber product thus formed has an outstandingly improved permeation resistance to organic solvents (for example, gasoline, engine oil, machine oil, thinner and the like) or gases (propane gas, Freon gas and the like). In the tubular rubber product laminated with the plastic film in this way, the plastic film and the rubber are well bonded to each other. If both of the ingredients are not sufficiently bonded, the plastic film may be peeled off upon use or result in breakage upon inserting metal caps and fail to attain the excellent performance, but the tubular rubber product according to this invention is free from such drawbacks.

Description will be made to the adhesive and the adhesive rubber, as well as adhesion method employed in this invention.

It is generally known to use liquid adhesives usually called as RFL for the bonding of organic fiber cords. RFL is a liquid mixture comprising an aqueous solution of an initial state condensate of resorcine and formaldehyde and a rubber latex. The rubber latex often employed includes styrene-butadiene copolymer rubber latex, vinylpyridine-styrene-butadiene copolymer rubber latex or the like. The reaction solvent preferably used is basic substance such as sodium hydroxide and ammonium hydroxide. In the case of bonding organic fiber cords by using the RFL adhesives, bonding can be attained only when baking is applied at a high temperature (200°-260° C.) after coating the organic fiber cords with the RFL adhesives.

While the same RFL adhesive solution as above can be used as the liquid adhesive in this invention, sufficient bonding can be obtained under ordinary vulcanizing condition (about 150° C. temperature) by merely drying at room temperature after coating the adhesive in the combination a polyamide resin or a polyester resin having a softening point near the vulcanizing temperature (120°-200° C.) with the RFL adhesive.

The initial stage condensate of resorcine and formaldehyde as the main ingredient of the adhesives usable in this invention can be prepared by reacting 0.8-7.5 mol of formaldehyde per one mol of resorcine and it can be prepared with ease near the normal temperature by the use of a basic catalyst. The rubber latex usable herein includes natural rubber latex and synthetic rubber latex such as styrene-butadiene copolymer rubber latex, vinylpyridine-butadiene-styrene copolymer rubber latex, and the like.

In this case where the rubber to be bonded is an ordinary rubber such as natural rubber, styrene-butadiene copolymer rubber, polybutadiene rubber, polyisoprene rubber and the like, one or more of the above-mentioned rubber latexes can be used. Usually the kind of the rubber latex is determined depending on the kind of the rubber to be bonded. For instance, in the case of the acrylonitrile-butadiene copolymer rubber, acrylonitrile-butadiene copolymer rubber latex can be used.

Referring then to the adhesive rubber for use in the dry adhesion method, there has been practiced, for the vulcanizing adhesion of organic fiber cords or brass or zinc plated steel cords to rubber, a method of blending a resorcine and a formaldehyde-forming substance and further silica powder into ordinary rubber such as natural rubber or synthetic rubber, for example, styrene-butadiene copolymer rubber, polybutadiene rubber and polyisoprene rubber, followed by bonding under vulcanization. However, the known method is insufficient for the vulcanizing adhesion between the plastic film and the rubber.

The adhesive rubber for use in this invention is slightly modified from the blend composition as described above, by which the plastic film and rubber can be bonded well under vulcanization. Specifically, the adhesive rubber for use in this invention comprises, as the basic rubber ingredient, a vinylpyridine-butadiene-styrene copolymer rubber either solely or in admixture with one or more of other ordinary rubber, for example, natural rubber, polybutadiene rubber, polyisoprene rubber, styrenebutadiene copolymer rubber, acrylonitrile-butadiene copolymer rubber and the like. The basic rubber ingredient is incorporated and kneaded with resorcine, formaldehyde-forming substance and silica powder and, as required, with reinforcing material such as carbon black, as well as other rubber blending chemicals usually employed, for example, inorganic filler, softening agent, aging stabilizer, vulcanizer and vulcanization promotor. By using such as adhesive rubber, the blend rubber and the plastic film can be bonded well through vulcanization under the vulcanizing condition of about 150° C.

Description will now be made to the amount of the liquid adhesive and blending ingredients in the adhesive rubber. With respect to the RFL adhesive, it is preferred to use the resorcine-formaldehyde resin by 5-40% by weight and, particularly, 10-20% by weight based on the total weight of the adhesive. The rubber latex is preferably used by 60-95% by weight and, more preferably, 80-90% by weight based on the total weight of the adhesive. Further, an effective amount of a basic compound such as sodium hydroxide and ammonium hydroxide is preferably added as the catalyst, by which the vulcanization can be adjusted.

Referring to the adhesive rubber, it is preferred to use the rubber ingredient between 50-90% by weight based on the total weight of the adhesive rubber, with more than 50% by weight of the rubber ingredient being preferably vinylpyridine-butadine-styrene copolymer. Further, it is preferred to blend 3-12% by weight of resorcine and 1-6% by weight of formaldehyde-forming substance, based on the total weight of the adhesive rubber, respectively. Further, in the same manner as in the usual rubber blending, reinforcing agent, filler, softening agent, aging stabilizer, acceleration aid, vulcanizer and vulcanization promotor may be blended each by an adequate amount for the preferred use as the adhesive rubber.

For the polyamide or polyester plastic film to be treated with the adhesive or the adhesive rubber as described above, it is important that the film has a low elastic module and is softened near the vulcanizing temperature. Those plastic films having high elastic module and high softening point, for example, 6-nylon or 66-nylon in the polyamide resin and polyethylenetetramine resin in the polyester resin are less preferred.

Suitable material for the plastic film usable in this invention is copolymer nylon, modified nylon, 11-nylon and 12-nylon as the polyamide resin. While on the other hand, copolyester resin (usually referred to as polyester elastomer) is preferred as the polyester resin. Each of the resin referred to has a low temperature softening point and a low elastic module.

The thickness of the plastic film for use in this invention is preferably 10-500 $\mu$m and, particularly, 50-100 $\mu$m, because if the thickness is less than 10 $\mu$m the permeation resistance is reduced and in excess of 500 $\mu$m the flexibility of the tubular rubber product may some time be worsened.

The rubber to be laminated with the plastic film is non-vulcanized rubber and the rubber ingredients employed therein are as described above. In the case of laminating the plastic film which has been subjected to the adhesion treatment as described above to the inner surface of the tubular rubber product such as a rubber hose, it is possible to employ a method, for example, of winding a plastic film while lapping around a mandrel generally used in the production of rubber hoses, braiding or spirally applying organic fiber cords on the film, coating an outer skin rubber thereover through extrusion molding in an extruder, and coalescing the plastic film with the rubber through softening and melting at a vulcanizing temperature and, simultaneously, bonding them both through vulcanization. In the case of laminating the plastic film as an intermediate layer by the method as described above, the plastic film is lapped over the inner tube rubber. Further, in the case of laminating the plastic film on the outer surface, the plastic film is lapped over the outer skin rubber. In this away, plastic-laminated tubular rubber products can be produced depending on the respective uses.

Lamination of the plastic film layer can be made by various methods, in addition to the lapping of the tape-like film as described above, such as lamination using heat shrinkable tubes, direct lamination by attaching a cross head die at the top end of an extruder, lamination by blow molding and, further, lamination by coating in a case where the resin employed is solvent-soluble.

This invention will now be explained more specifically referring to examples although this invention is not restricted to them.

[EXAMPLE 1]

Each kind of rubber (vulcanized rubber) shown in Table 1 in an ordinary blending composition containing 50 parts of carbon black was cleaned at the surface thereof with hexane, dried, and then immersed in 5 wt % solution of trichloroisocyanuric acid in acetone for one minute, followed by air drying.

Then, the rubber specimen was immersed in 15 wt % solution of organic solvent soluble copolymerized nylon ($\epsilon$-caprolactam/adipic acid/hexamethylenediamine/bis(p-aminocyclohexyl)methane copolymer, Nycote MT 25, manufactured by Hakuyo Co.) in methanol, applied with coating, then heated at 100° C. for one minute and removed with the solvent to form nylon coating layer in about 10 $\mu$m thickness.

The nylon coated rubber (laminate) thus prepared was immersed in acetone or n-hexane to swell the rubber, and the bondability between the rubber and the coated nylon was examined.

The results are shown in Table 1.

TABLE 1

| Kind of rubber** | Bondability Solvent | Bondability* |
| --- | --- | --- |
| NBR | acetone | O |
| CR | " | O |
| SBR | " | O |
| NR | hexane | O |
| BR | " | O |
| RB | " | O |
| IR | " | O |

*Bondability
O: well bonded
X: peeled
**NBR: acrylonitrile-butadiene rubber
CR: chloroprene rubber
SBR: styrene-butadiene rubber
NR: natural rubber
BR: polybutadiene rubber
RB: syndiotactic-1,2-polybutadiene (manufactured by Nippon Synthetic Rubber Co.)
IR: polyisoprene rubber From the result of Table 1, it can be seen that the nylon lamination method according to this invention shows satisfactory bonding and is effective to various kinds of rubbers.

[EXAMPLE 2]

In the same manner as in Example 1, the soluble copolymerized nylon as set forth in Example 1 was coated to about 10 $\mu$m thickness over the entire surface of a vulcanized high nitrile NBR specimen of an ordinary blending composition containing 50 parts of carbon black (15×15×1 mm) and immersed in the solvent as shown in Table 2 at room temperature, and the swelling rate was measured.

Further, the swelling rate of vulcanizate NBR itself was also measured for the comparison.

The results are shown in Table 2.

$$\text{Swelling rate } (\%) = \frac{\text{increase in weight}}{\text{initial weight}} \times 100$$

TABLE 2

| Immersion time | Swelling rate | |
|---|---|---|
| | NBR/soluble nylon 40 day | NBR 2 day |
| Solvent | | |
| Hexane (SP value 7.3) | 0% | 0.2% |
| Spindle oil | 0 | 0.6 |
| Carbon tetrachloride (SP value 8.6) | 0.7 | 9.0 |
| Toluene (SP value 8.9) | 0 | 53 |
| Ethyl acetate (SP value 9.1) | 0 | 59 |
| Methyl ethyl ketone (SP value 9.3) | 3.6 | 96 |
| Methanol (SP value 14.5) | 10 | 11 |
| 10% NaOH | 0.4 | 1.1 |

From the results of Table 2, it was observed that the nylon-coated NBR obtained by the method according to this invention had a remarkable solvent-resistant effect against organic solvent and alkali as compared with NBR vulcanizate.

[EXAMPLE 3]

A soluble nylon (CM 8000 manufactured by Toray Co.) was coated to about 10 μm thickness in accordance with the procedure as in Example 1 to the inner circumferential surface of an oil-resistant hose of about 600 mm length, 10 mm inside diameter and 23 mm outside diameter having an inner tube layer made of high nitrile vulcanizate.

Then, the hose was attached at the both ends thereof with metal fittings by calking, filled the inside thereof with each of the solvents as shown in table 3 and capped at the opening thereof and then left as it was at a room temperature for a predetermined period to examine the reduction in the weight.

The same measurement was also carried out to the hoses not applied with the nylon coating for the comparison.

The results are shown in Table 3.

$$\text{Weight reduction rate (\%)} = \frac{\text{initial weight} - \text{measured weight}}{\text{initial weight}} \times 100$$

TABLE 3

| Solvent | Nylon coating | Weight reduction rate | | | | | |
|---|---|---|---|---|---|---|---|
| | | After one month | After 2 month | After 3 month | After 6 month | After 20 month | |
| Toluene | Yes | 0% | 0% | 0% | 1% | 2% | Example |
| | No | 65 | 80 | 85 | 90 | 100 | Comparative Example |
| Regular gasoline | Yes | 0 | 0 | <0.5 | 1 | 2 | Example |
| | No | 0 | 2 | 6 | 28 | 40 | Comparative Example |
| Freon-11 | Yes | 0 | 0.5 | 1 | 1.5 | 2 | Example |
| | No | 1.5 | 12 | 30 | 75 | 95 | Comparative Example |

As apparent from Table 3, it was observed that the nylon-laminated hoses according to this invention had outstandingly improved solvent-resistant function as compared with ordinary oil-resistant hoses.

Furthermore, when the nylon-laminated hoses according to this invention were used as the gasoline hose, no changes were observed at all both in the appearance (size) and the flexibility before and after the use. While on the other hand, non-coated rubber hoses released gasoline odors and swelling in the hoses due to gasoline was observed.

[EXAMPLE 4]

The swelling rate was measured in the same manner as in Example 2 by using vulcanized rubber: NR/SBR (70/30) of ordinary blending composition.

In this case, the soluble copolymerized nylon as in Example 1 was coated as the soluble nylon to about 10 μm thickness. The solvent used for the test was a non-lead gasoline and the solvent immersion was carried out at room temperature. The results are shown in Table 4.

TABLE 4

| Days of immersion | Swelling rate | | | |
|---|---|---|---|---|
| | one day after | 10 day after | 20 day after | 40 day after |
| Nylon coating: Yes | 0% | 0% | 0% | 0% |
| Nylon coating: No | 185% | 190% | 190% | 190% |

From the results of Table 4, it was observed that an excellent oil-resistance can be provided to an inexpensive and highly workable non-oil resistant rubber according to this invention.

[EXAMPLE 5]

The gas permeation-resistant effect obtained by the coating was evaluated using the same hoses as in Example 3 and by comparing the gas permeability between the nylon-coated hose and non nylon-coated hose.

It this case, Freon 12 ($CCl_2F_2$) was sealed by an amount of $0.6 \pm 0.1$ g/cm$^3$ to the inside of the hose and test was carried out at 100° C. for 72 hours. The results are shown in Table 5.

$$\text{Gas permeability} = \frac{\text{weight loss in the gas sealed hose}}{\text{free length of hoses}} - \frac{\text{weight loss in the not gas-sealed hose}}{\text{free length of hose}}$$

TABLE 5

| | Gas permeability | |
|---|---|---|
| | Gas permeability (g/m/72 hr) | |
| Nylon-coated hose | 2.61 | Example |
| Not-coated hose | 25.86 | Comparative Example |

From the results of Table 5, it can be seen that the permeability of gas (Freon 12) is extremely reduced in the nylon-coated hose according to this invention, which therefore has an effect of supressing the gas permeation. In the case of using $O_2$, $N_2$, LPG gas, $CO_2$, CO, Ar, He, halogen gases or the like instead of Freon, the nylon coated hose also showed a significant effect for suppressing the permeation against these gases.

[EXAMPLE 6]

In order to examine the effect of preventing the contaminations caused by the leaching of rubber chemical, the nylon-coated rubber hoses and non-coated rubber hoses as in Example 3 were filled with non-lead gasoline respectively, left as they were at room temperature for one week, and then extracted with gasoline. The extracted ingredients were analyzed by a gas chromatographic mass analyzer.

As the result, plasticizer (DOA) and oils leached out from the rubber were detected in the gasoline extracted from the non-coated hoses and the amount of leaching was substantially equal to the amount blended in the rubber.

On the contrary, in the gasoline extracted from the nylon-coated hoses, the above-mentioned extracted ingredients as well as other leaching ingredients were scarcely detected to indicate that the effect of preventing the rubber chemical contamination in the nylon-coated hose was very much excellent.

[EXAMPLE 7]

In order to study the nylon lamination effect according to this invention, the solvent-resistance was examined by the same manner as in Example 2 with respect to the products prepared by applying halogenoid treatment (using 5 wt % trichloroisocyanuric acid (TCCA) solution in acetone) to the surface of oil-resistant NBR rubber and then applying the coating of soluble nylon (CM 8000 manufactured by Toray Co.), products applied only with halogenoid treatment, products directly applied with the soluble nylon coating without halogenoid treatment, as well as non-treated and non-coated rubber products. Regular gasoline was used as the solvent.

Results are shown in Table 6.

TABLE 6

| Day of immersion | Swelling rate | | | | | |
| --- | --- | --- | --- | --- | --- | --- |
| | 1 day | 5 day | 10 day | 20 day | 30 day | |
| TCCA treated nylon coated | 0% | 0% | 0% | 0% | 0% | Example |
| TCCA treated only | 0 | 1.3 | 2.8 | 6.0 | 8.8 | Comparative Example |
| Nylon coat only | 0 | 3.3 | 5.0 | 7.3 | 10.5 | Comparative Example |
| Not treated. not coated (rubber itself) | 18.0 | 17.5 | 16.6 | 16.5 | 16.5 | Comparative Example |

From the results of Table 6, it can be confirmed that the halogenoid treatment itself is not yet sufficient although it provides a certain extent of solvent resistance to the rubber. In addition, the direct application of nylon coating to the rubber can not provide a sufficient solvent-resistant effect due to the nylon layer, while on the other hand, that application of nylon coating after the halogenoid treatment results in excellent bonding between the nylon and the rubber to exhibit highly solvent-resistant effect. Thus, it has been found that the excellent synergistic effect can be obtained only according to this invention.

[EXAMPLE 8]

A rubber mandrel of 15 mm diameter was covered with a NR/SBR rubber of a standard blending composition as shown below to a 20 mm diameter by using an extruder. Then, the outer circumferential surface of the non-vulcanized rubber member was dipped with 5 wt % solution of trichloro-isocyanuric acid in acetone, followed by sufficient air drying. Specifically, non-treated rubber member was also prepared as the comparison. Then, each of the coated rubber members was dipped in 10 wt % soluble nylon (CM 4000 manufactured by Toray Co.) solution in methanol-trichloroethylene (50:50) and then air dried. Then, it was covered thereover with the NR/SBR rubber described above using an extruder into a 25 mm diameter and then vulcanized in a steam autoclave at 145° C. Each of the hoses thus prepared was cut into a 50 cm length, filled with toluene and Freon 11 and calked at both ends thereof. The weight reduction rate due to the filled solvent was determined with the elapse of time. The results are shown in Table 7.

| Rubber composition | |
| --- | --- |
| Natural rubber | 60 parts by weight |
| Styrene-butadiene copolymer rubber | 40 parts by weight |
| HAF carbon black | 50 parts by weight |
| Petroleum type softening agent | 10 parts by weight |
| Stearic acid | 2 parts by weight |
| 11-phenyl-$\beta$-naphthylamine | 1 parts by weight |
| 2-benzothiazolyl sulfide | 0.5 parts by weight |
| Diphenylguanidine | 0.3 parts by weight |
| Zinc oxide | 5 parts by weight |
| Sulfur | 2 parts by weight |

TABLE 7

| Days of immersion | Example | | Comparative Example | |
| --- | --- | --- | --- | --- |
| | Toluene | Freon 11 | Toluene | Freon 11 |
| 0 | 0.1% | 0.1% | 0.1% | 0.1% |
| 1 day | 0% | 0% | 2% | 5% |
| 5 day | 0% | 0% | 50% | 47% |
| 10 day | 0% | 0% | 68% | 65% |
| 20 day | 0% | 0% | 80% | 73% |
| 30 day | 1% | 2% | 90% | 85% |
| 60 day | 3% | 4% | 95% | 93% |

[EXAMPLE 9]

The reduction of the wall thickness of rubber by nylon coating was examined.

The wall thickness of the NBR rubber hoses of the standard blending composition as described above was reduced to 3.0, 2.5, 2.0 and 1.5 mm as compared with the present standard of 3.5 mm and CM 4000 (Toray Co.) and was coated (about 20 $\mu$m) to the inside for each of the hoses in the same manner as described above, and then the gas permeation test for Freon 12 was carried out.

The results are shown in Table 8.

TABLE 8

| Wall thickness (mm) | Gas permeability (g/m/72 hr/100° C.) |
| --- | --- |
| 3.5 (present standard, non-coat) | 25.9 |
| 3.5 (CM 4000 coat) | 4.8 |
| 3.0 (CM 4000 coat) | 5.0 |
| 2.5 (CM 4000 coat) | 6.4 |
| 2.0 (CM 4000 coat) | 8.0 |

TABLE 8-continued

| Wall thickness (mm) | Gas permeability (g/m/72 hr/100° C.) |
| --- | --- |
| 1.5 (CM 4000 coat) | 8.3 |

From the results of Table 8, it was found that the gas permeability could be reduced to less than ⅓ of the present standard (non coat) even with the rubber wall thickness being reduced to 1.5 mm and that the tubular rubber products such as rubber hoses, rubber couplings and the like having effectively reduced thickness and weight could be obtained according to this invention.

Next, Examples using polyamide resin film and polyester resin film are shown below.

[EXAMPLE 10]

Examples for synthesizing and blending the ingredients of RFL liquid adhesives used in each of the following Examples are at first described. Resorcineformaldehyde initial stage condensate was prepared by adding 9.3 g (0.085 mol) of resorcine, 11.7 g of 35% formaldehyde (0.137 mol) and 9.8 g of 29% ammonium hydroxide respectively to 264 g of water and reacting while keeping the temperature at 25° C. for 48 hours. (solid concentration 5.5%)

As the rubber latex, 2-vinylpyridinestyrene-butadiene copolymer rubber latex (solid concentration 41%, JSR 0650, manufactured by Nippon Synthetic Rubber Co.) was used.

Then, the respective starting materials were blended in a predetermined ratio as shown in Table 9 to prepare liquid adhesives in an aqueous solution at 20% solid concentration.

TABLE 9

| Composition of liquid adhesives | | | | |
| --- | --- | --- | --- | --- |
| | No. 1 | No. 2 | No. 3 | No. 4 |
| Vinylpyridine-butadiene styrene rubber latex | 100 | 100 | 100 | with no adhesives |
| Resorcine-formalin condensate | 5 | 15 | 30 | |

While on the other hand, a film of 0.1 mm thickness prepared by using a T-die of an extruder was used as a plastic film for the adherand. In this case, polyamide resin and polyester resin were used as the plastics, in which three types of resins having different melting points were selected respectively. Specifically, copolymerized nylon of CM-4000 (manufactured by Toray Co.), 12-nylon of Diamide L-1801 (manufactured by Daisel Co.) and 6-nylon of CM-1041 (manufactured by Toray Co.) were used as the polyamide resin, and polyester elastomer of Hytolyl-4056, 4075 and 5766 (each manufactured by Du'Pont Co.) were used as the polyester resin.

Each of the adhesives as described above was coated and dried at a room temperature on both surfaces of the plastic films.

Then, the plastic sheets treated with the adhesives were put between non-vulcanized rubber sheets each having a 2 mm thickness prepared by the blending composition shown in Table 10 and then bonded through vulcanization respectively in a vulcanizing press at a temperature 140° C. and 180° C. Each of the vulcanizates was punched into a rectangular shape of 25 mm width and 100 mm length and subjected to T-peeling test under the condition of a tensile rate at 50 mm/min using a tensile tester and the bonding strength was estimated. The results are shown in Table 11.

As the Comparative Examples, those laminated without coating the adhesives were also tested.

TABLE 10

| Blending composition for non-vulcanized rubber | |
| --- | --- |
| | parts by weight |
| Natural rubber | 60.0 |
| Styrene-butadiene copolymer rubber | 40.0 |
| HAF carbon black | 50.0 |
| Petroleum type softening agent | 10.0 |
| Stearic acid | 2.0 |
| N—phenyl-β-naphthylamine | 1.0 |
| Zinc oxide | 5.0 |
| 2-benzothiazolyl sulfide | 0.5 |
| Diphenylguanidine | 0.3 |
| Sulfur | 2.0 |

TABLE 11

| | T-peeling (kg/25 mm) | | | | | | | | | |
| --- | --- | --- | --- | --- | --- | --- | --- | --- | --- | --- |
| Liquid adhesive | No. 1 | | | No. 2 | | | No. 3 | | | No. 4 |
| Polyamide resin | Copolymerized nylon *1 | 12-nylon *2 | 6-nylon *3 | Copolymerized nylon *1 | 12-nylon *2 | 6-nylon *3 | Copolymerized nylon *1 | 12-nylon *2 | 6-nylon *3 | Copolymerized nylon *1 |
| Vulcanized at 140° C. | more than 20 | 5 | 1 | more than 20 | 7 | 1 | 18 | 6 | 1 | 0 |
| Vulcanized at 180° C. | 15 | 18 | 1 | 16 | more than 20 | 1 | 12 | 15 | 1 | 0 |
| Polyester resin | Polyester elastomer *4 | polyster elastomer *5 | polyster elastomer *6 | polyster elastomer *4 | polyster elastomer *5 | polyster elastomer *6 | polyster elastomer *4 | polyster elastomer *5 | polyster elastomer *6 | polyster elastomer *4 |
| Vulcanized at 140° C. | 18 | 3 | 1 | more than 20 | 5 | 2 | 13 | 6 | 1 | 0 |
| Vulcanized at 180° C. | 8 | 12 | 1 | 10 | 15 | 3 | 10 | 12 | 1 | 0 |

*1 CM-4000 (manufactured by Toray Co.) mp 140° C.
*2 L-1801 (manufactured by Daisel Co.) mp 180° C.
*3 CM-1041 (manufactured by Toray Co.) mp 225° C.
*4 Hytolyl 4056 (manufactured by Du'Pont) mp 156° C.
*5 Hytolyl 4075 (manufactured by Du'Pont) mp 274° C.
*6 Hytolyl 4766 (manufactured by Du'Pont) mp 213° C.

[EXAMPLE 11]

Adhesive rubber system was employed in this example as an adhesion method different from that in Example 10.

As the rubber latex, 2-vinylpyridine-styrenebutadiene copolymer rubber latex (solid concentration 41%, JSR 0650, manufactured by Nippon Synthetic Rubber Co.) was added to a great amount of methanol under stirring and reprecipitated again. Then, after being washed with water sufficiently, it was dried to obtain 2-vinylpyridine-styrene-butadiene copolymer rubber. Resorcine, hexamethylene tetramine (HCHO-forming substance) and silicon dioxide (Nipsyl VN-3, Trade Mark) were blended at a predetermined ratio shown in Table 12 into the 2-vinylpyridine-styrene-butadiene copolymer rubber by using a small-sized Banbury mixer and further kneaded while adding other blending agents shown in Table 12. Thereafter, it was sheeted to a 0.5 mm thickness in an open roll to obtain a rubber sheet.

TABLE 12

| Blending composition for adhesive rubber (parts by weight) | | | | |
| --- | --- | --- | --- | --- |
| | No. 5 | No. 6 | No. 7 | No. 8 |
| 2-vinylpyridine-styrene-butadiene copolymer | 100 | 100 | 100 | 100 |
| Resorcine | 3 | 5 | 7.5 | — |
| Hexamethylentetramine | 1.5 | 3 | 5 | — |
| Silicon dioxide (VN-3) | 5 | 10 | 20 | — |
| Carbon black | 30 | 30 | 30 | 30 |
| N—phenyl-$\beta$-naphthylamine | 1 | 1 | 1 | 1 |
| Strearic acid | 1 | 1 | 1 | 1 |
| Zinc oxide | 5 | 5 | 5 | 5 |
| N—oxydiethylene-2-benzothiazole sulfenamide | 1 | 1 | 1 | 1 |
| Sulfur | 2 | 2 | 2 | 2 |

Then, after washing three types of the polyamide resin films and three types of the polyester resin films as used in Example 10 respectively with acetone, the adhesive rubber sheets were appended on both surfaces of the plastic films. Thereafter, each of them was put between the non-vulcanized rubber sheets (2 mm) as shown in Table 10 and then bonded through vulcanization respectively using a press at a temperature of 140° C. and 180° C. respectively. Then, the same adhesion test as in Example 10 was carried out and the adhesion was evaluated. The results are shown in Table 13.

[EXAMPLE 12]

Using the wet adhesion treatment as shown in Example 10, rubber hoses laminated with plastic films were obtained.

In the production process, a copolymerized nylon film (CM 4000, manufactured by Toray Co.) of 0.1 mm thickness was coated only on one surface thereof with the adhesives shown by No. 2 in Example 10 and dried at room temperature. Thereafter, the film was cut to 20 mm width into a tape-like shape. Then, the tape prepared as above was wound around while lapping on a rubber mandrel of 10 mm diameter treated with silicone releasing agent such that the adhesive treated surface lied on the upper side. Thereafter, blend rubber as shown in Table 10 was covered so as to form a 20 mm diameter by using an extruder to obtain a rubber hose laminated at the inner side thereof with the plastic film.

Further, for producing a rubber hose in which a plastic film was laminated as an intermediate layer to rubber, No. 2 adhesives were coated on both surfaces of a copolymer nylon film (0.1 mm), dried and then cut into a tape of 20 mm width. While on the other hand, blend rubber shown in Table 10 was covered on a rubber mandrel with 10 mm diameter so as to form 15 mm diameter by using an extruder. Then, the tape was wound while lapping. Further, the same rubber was covered thereover by using an extruder so as to form 20 mm diameter to obtain a rubber hose in which a plastic film was laminated as an intermediate layer.

Then, the rubber hose molded and fabricated by the method described above was bonded through vulcanization in a steam autoclave under the temperature condition of 145° C. to obtain a vulcanized rubber hose. Each vulcanized rubber hose was cut into 50 cm length and metal caps capable of close sealing were attached to each of the ends. As the comparison, rubber hoses not laminated with the plastic films were also prepared by the similar means. Then, 30 g of toluene or 60 g of Freon-11 was sealed in the respective hoses, and left as they were at room temperature. The solvent permeability from the vulcanized rubber hoses was determined based on the change in the weight. The results are shown in Table 14.

TABLE 13

| | T-peeling Test (kg/25 mm) | | | | | | | | | |
| --- | --- | --- | --- | --- | --- | --- | --- | --- | --- | --- |
| Adhesive rubber | No. 5 | | | No. 6 | | | No. 7 | | | No. 8 |
| Polyamide resin | Copolymerized nylon *1 | 12-nylon *2 | 6-nylon *3 | Copolymerized nylon *1 | 12-nylon *2 | 6-nylon *3 | Copolymerized nylon *1 | 12-nylon *2 | 6-nylon *3 | Copolymerized nylon *1 |
| Vulcanized at 140° C. | more than 20 | 3 | 1 | more than 20 | 3 | 1 | more than 20 | 5 | 1 | 0 |
| Vulcanized at 180° C. | 12 | 15 | 1 | 19 | 18 | 1 | 13 | more than 20 | 1 | 0 |
| Polyester resin | polyester elastomer *4 | polyester elastomer *5 | polyester elastomer *6 | polyester elastomer *4 | polyester elastomer *5 | polyester elastomer *6 | polyester elastomer *4 | polyester elastomer *5 | polyester elastomer *6 | polyester elastomer *4 |
| Vulcanized at 140° C. | 15 | 3 | 1 | 18 | 5 | 1 | more than 20 | 5 | 1 | 0 |
| Vulcanized at 180° C. | 10 | 18 | 1 | 12 | | 2 | 10 | 15 | 1 | 0 |

*1-6 have the same meanings as Table 11.

TABLE 14

| | Example | | | | Comparative Example | |
|---|---|---|---|---|---|---|
| | Inner face laminated rubber hose | | Intermediate layer laminated hose | | Rubber hose not laminated with any plastic layer | |
| Solvent | Toluene | Freon-11 | Toluene | Freon-11 | Toluene | Freon-11 |
| Day elapsed 0 day | 0% | 0% | 0% | 0% | 0% | 0% |
| Day elapsed 1 day | 0 | 0 | 0 | 0 | 0 | 0 |
| Day elapsed 2 day | 0 | 0 | 0 | 0 | −12 | −9 |
| Day elapsed 5 day | 0 | 0 | 0 | 0 | −52 | −45 |
| Day elapsed 10 day | 0 | 0 | 0 | 0 | −72 | −63 |
| Day elapsed 30 day | −1 | 0 | −1 | 0 | −90 | −85 |
| Day elapsed 60 day | −2 | −1 | −3 | −1 | −95 | −90 |

[EXAMPLE 13]

Using the dry adhesion treatment as shown in Example 11, rubber hoses laminated with plastic films were prepared.

At first, No. 6 adhesive rubber was sheeted into 0.5 mm thickness to obtain a sheet. While on the other hand, a sheet of copolymerized nylon CM 4000 (manufactured by Toray Co.) with 0.1 mm thickness was cut into a tape-like configuration of 20 mm width as the laminating plastic film.

For producing rubber hoses, a tape of the plastic film was wound around while lapping over a rubber mandrel of 10 mm diameter after being treated with silicone releasing agent and, thereafter, the adhesive rubber sheet prepared as above was wound around while lapping thereover to form a cover.

Furthermore, for producing rubber hoses, in which a plastic film was laminated to the intermediate layer of rubber, the rubber shown in Table 10 was covered on a rubber mandrel of 10 mm diameter so as to form 15 mm diameter. Then, after lap winding the No. 6 adhesive rubber sheet thereover, a plastic film was lap wound in the same manner. Then, rubber shown in Table 10 was covered so as to form a 20 mm diameter by using an extruder to obtain a rubber hose in which a plastic film was laminated as the intermediate layer.

Then, the rubber hose molded and fabricated by the above described method was bonded through vulcanization in a steam autoclave under the temperature condition of 145° C. to obtain a vulcanized rubber hose.

Each vulcunized rubber hose was cut into 50 cm length and attached at both ends thereof with metal caps capable of close sealing. Thereafter, 30 g of toluene or 60 g of Freon-11 were sealed in each hose and the hose was left as it was at room temperature. The solvent permeability from the rubber hose was determined based on the change in the weight. The results are shown in Table 15.

TABLE 15

| | Example | | | | Comparative Example | |
|---|---|---|---|---|---|---|
| | Inner face laminated rubber hose | | Intermediate layer laminated hose | | Rubber hose not laminated with any plastic layer | |
| Solvent | Toluene | Freon-11 | Toluene | Freon-11 | Toluene | Freon-11 |
| Day elasped 0 day | 0% | 0% | 0% | 0% | 0% | 0% |
| Day elasped 1 day | 0 | 0 | 0 | 0 | 0 | 0 |
| Day elasped 2 day | 0 | 0 | 0 | 0 | −12 | −9 |
| Day elasped 5 day | 0 | 0 | 0 | 0 | −52 | −45 |
| Day elasped 10 day | 0 | 0 | 0 | 0 | −72 | −63 |
| Day elasped 30 day | 2 | −1 | −2 | 0 | −90 | −85 |
| Day elasped 60 day | −3 | −2 | −4 | −2 | −95 | −90 |

[EXAMPLE 14]

The reduction for the wall thickness of rubber (weight reduction) in the nylon-laminated rubber hose was examined.

A nylon film (CM 4000, manufactured by Toray Co.) of 100 μm thickness was coated at one surface thereof with No. 2 adhesives in Example 12 and dried and lapped over a mandrel. Thereafter, blend rubber shown in Table 10 was extruded for covering so as to make the wall thickness of the hoses to 4.0, 3.0, 2.0 and 1.5 mm by using an extruder.

Then, they were bonded through vulcanization in a steam autoclave at 145° C. to obtain nylon laminated rubber hoses.

Each of the rubber hoses was cut into 50 cm length and after being sealed with each 60 g of Freon-11 therein, left as it was for one week at room temperature. The solvent permeability was determined based on the changes in the weight. The results are shown in Table 16.

TABLE 16

| Wall thickness (mm) | Hose weight (g) | Solvent permeability (Freon 11) (%) |
| --- | --- | --- |
| 4.0 | 101 | 0.0 |
| 3.0 | 71 | 0.0 |
| 2.0 | 43 | 0.0 |
| 1.5 | 31 | 0.5 |

From the above result, it was found that there was no problem for the solvent permeability even if the wall thickness of rubber was reduced to 1.5 mm and, accordingly, the weight of the rubber hose could be decreased.

The tubular rubber product according to this invention as described above is used in the state where a head is attached to one end thereof.

Figure 7:
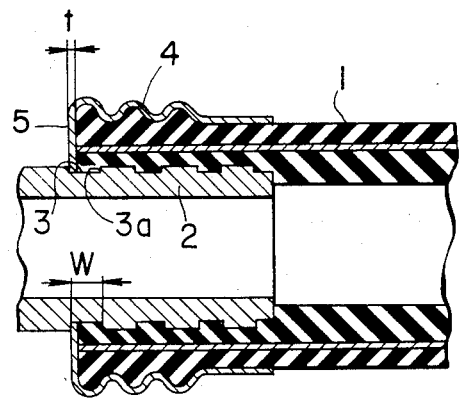
FIG. 7 is a cross sectional view showing a conventional embodiment.

As the head for such a tubular rubber product, a hose head as shown in FIG. 7 has been known. The hose head comprises a nipple 2 to be inserted into one end portion of a hose 1 and formed with a broad circumferential groove 3 situated near the one end of the hose 1, and a sleeve 4 to be disposed over the outer circumference of the hose 1 and having an inward flange 5 for fitting into the circumferential groove 3. The inward flange 5 is made movable in the axial direction of the sleeve 4 within the circumferential groove 3 of an axial width 2–3 times greater than the thickness of the flange.

In this hose head, on the occasion that an internal pressure is exerted to the hose 1, since the hose 1 is relatively displaced to the central portion of the nipple 2 due to the tension resulting in the hose 1, thereby moving the inword flange 5 within the circumferential groove 3 toward the central portion of the hose 1, the rubber material of the hose fitting into the circumferential groove 3 can be put between the inward flange 5 and the side wall 3a of the circumferential groove 3 to improve the sealing function.

Such a conventional hose head can provide sufficient liquid and air-tightness, pressure-resistance or other like performance for the ordinary use of general rubber hoses. However, in a case where a synthetic resin layer is disposed to the inner circumference of the hose in order to decrease the thickness for the cost reduction and improve the durability of the hose, as well as to enhance the gas and liquid-impermeability, such a synthetic resin can provide no sufficient sealing performance for fluid to be transported in a hose even when it is put between the inward flange 5 and the side wall 3a of the circumferential groove 3 by the conventional hose head in the same manner as the rubber hose, because the synthetic resin is generally more rigid and has a lower frictional coefficient than rubber and is less fitting to the circumferential groove 3. This problem becomes particularly remarkable where the reactive force to the compression of the hose obtained by the caulking of the sleeve is lowered under the severe working conditions, for instance, if the hose is exposed to high temperature.

Therefore, a hose head suited to the tubular rubber product according to this invention is highly demanded, particularly, to the rubber product in which a resin layer 20 is formed to the inner circumference of a tubular rubber product 10 as shown in FIG. 1. In this case, it is desired that the hose head can significantly improve the sealing performance by sufficiently increasing the caulking pressure at a required portion of the hose upon caulking the sleeve at a part corresponding to the circumferential groove. In addition, the hose head should enable the synthetic resin layer to be seized at a large force due to the relative displacement of the hose to the nipple obtainable by the large movement of the inward flange, and maintain a sufficient gas and liquid-tightness even after the heat degradation of the flexible hose.

A suitable hose head capable of satisfying the foregoing requirements desirably comprises a nipple and a sleeve designed as below.

(i) The outer diameter of the nipple at one end portion is larger than the outer diameter thereof at the other end portion. One or a plurality of ring-like ridges are formed at the outer circumference on the other end portion and each of the ridges has a seizing surface opposing to the larger diameter portion and extended in the direction perpendicular to the axial direction of the nipple.

(ii) The sleeve has a ring-like inward flange at one end.

(iii) The distance between the larger diameter portion and the ridge adjacent therewith of the nipple is four times or more as large as the thickness of the inward flange.

(iv) The nipple is inserted from the other end portion thereof having the ridge into the opening on one end of the flexible hose having the synthetic resin layer at its inner circumference surface. The sleeve is disposed so as to cover the outer circumference at one end portion of the hose and the inward flange is situated between the larger diameter portion of the nipple and the ridge adjacent therewith and is in contact with one end face of the hose. The sleeve is subjected to caulking at a portion between the ridge adjacent with the larger diameter portion of the nipple and one end of the hose, and the inner diameter of the inward flange of the sleeve is made smaller than the outer diameter of the larger diameter portion and the outer diameter at the top of the ridge of the nipple after caulking.

In the hose head, since the sleeve is caulked at the position between the ridge of the nipple and one end of the hose, sufficient caulking pressure can be provided at the position to the one end portion of the hose to improve the close bondability between the hose and the surface of the nipple, as well as the portion of the hose put under the large caulking pressure is brought into contact under the large force with the seizing surface of the ridge extended in the direction perpendicular to the axial line of the nipple upon relative displacement of the hose to the nipple toward the central portion of the hose. In addition, since the inward flange of the sleeve in contact with the one end of the hose can be moved significantly between the larger diameter portion and the ridge adjacent therewith along a distance four times or more of the thickness of the inward flange, a significantly large seizing force can be provided to the portion of the hose present between the inward flange and the ridge upon relative displacement of the hose to the nipple. Therefore, a sufficient sealing performance can be attained due to the great compressive deformation, particularly, in that portion of the hose even under the severe working conditions as well as under usual working conditions.

Figure 4:
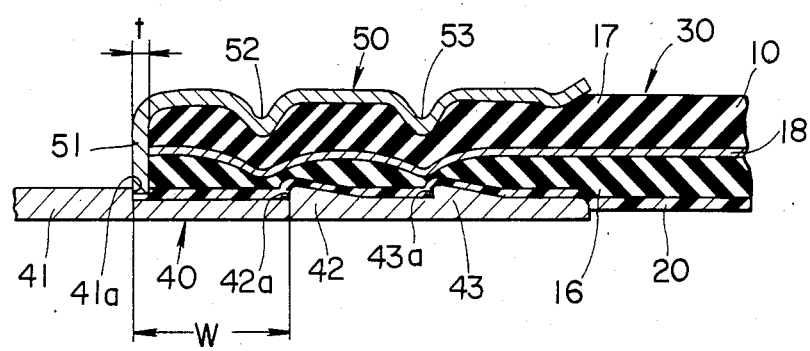
FIG. 4 is a partial cross sectional view for one embodiment according to this invention.
Figure 5:
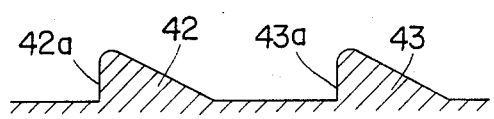
FIG. 5 is an enlarged cross sectional view for the ridge.

The specific embodiment of the head will be explained while referring to FIG. 4 through FIG. 6. In the drawing, a flexible hose 30 comprises a tubular rubber product main body 10 and a synthetic resin layer 20, for example, of 10–100 μm thickness formed at the inner circumferential surface thereof. The main body 10 comprises an inner rubber layer 16, an outer rubber layer 17 and a reinforcing layer 18 put between the both layers 16 and 18. A nipple 40 is attached to the inner side and a sleeve 50 is attached to the outer side at one end portion of the hose 30 respectively. The nipple 40 and the sleeve 50 are respectively formed entirely into the cylindrical configuration.

The nipple 40 shown in the drawing to be inserted into the inner side of the flexible hose 30 has a larger thickness at one end portion 41 thereof protruding from the hose 30 so that the outer diameter at one end portion 41 is larger than the outer diameter at the other end portion thereof. Two circular ridges 42, 43 aparting axially from each other are formed around the outer circumference on the other end portion situating to the inside of the hose 30. The ridges 42, 43 have a shoulder 42a, 43a respectively and each shoulder has a seizing surface opposing to the shoulder 41a on the other end of the larger diameter portion 41 and extended in perpendicular to the axial line of the nipple 40. The height for each of the ridges 42, 43 may be desirably increased gradually toward the larger diameter portion 41 as shown in the enlarged cross sectional view of FIG. 5, in order to facilitate the insertion of the nipple 40 into the hose 30. Furthermore, the top end of each of the ridges 42, 43 may be rounded as shown in FIG. 5 so that the insertion of the nipple 40 can be further facilitated and cracks or cuts resulted to the inner circumferential surface of the hose can effectively be prevented upon caulking of the sleeve 50.

Although two ridges 42, 43 are formed around the outer circumference on the other end portion of the nipple 40 in this embodiment, the number of the ridges should preferably be decreased as much as possible provided that they can attain the intended effect, because the force exerted to each of the ridges when the flexible hose 30 undergoes a stress with inner pressure is made larger as the number of the ridges is decreased and, as the result, the abutting force between the hose 30 and the seizing surface of the ridge is increased to improve the sealing performance.

The sleeve 50 disposed around the outer circumference of the flexible hose 30 has an inward flange 51. After the caulking to the sleeve 50, the inner diameter of the inward flange 51 is smaller than the outer diameter for the larger diameter portion 41 of the nipple 40 and the outer diameter for the top end of the ridge 42, 43, and the flange 51 abuts against the one end of the flexible hose 30 between the larger diameter portion 41 of the nipple 40 and the ridge 42 in adjacent therewith. The inward flange 51 is usually maintained at a position abutting against the shoulder 41a at the end face of the larger diameter portion 41 by the flexible hose 30. As described above, the inner diameter of the inward flange 51, after the caulking of the sleeve 50, is made smaller than the outer diameter portion 41 and the outer diameter for the top end of the ridges 42, 43, because if it is larger than them, the one end face of the hose will be bulged externally through a gap between the inner circumferential surface of the flange 51 and the larger diameter portion 41 upon caulking of the sleeve 50, failing to obtain a sufficient improvement in the caulking pressure, and because the end portion of the hose can not be seized between the flange 51 and the ridges 42, 43 with a sufficient force upon displacement of the inward flange 51 to the central portion of the hose.

The sleeve 50 is caulked at least at a position deviated from the ridge 42 in adjacent with the larger diameter portion 41 of the nipple 40 toward the one end of the hose 30. In the illustrated embodiment, the sleeve is caulked over the entire circumference at the positions deviated from the ridges 42, 43 toward the one end of the hose. In the drawing, reference numerals 52, 53 represent circumferential grooves formed by the caulking. Since these circumferential grooves 52, 53 cause particularly large compressive deformation at their positions to the one end portion of the flexible hose 30, the one end portion of the hose 30 is intensely bonded to the surface of the nipple 40 at the positions corresponding to the circumferential grooves 52, 53 deviated from the ridges 42, 43 toward the one end of the hose, and the sleeve 50 is deformed following after the deforming behavior of the one end portion of the hose. Accordingly, upon relative displacement of the flexible hose 30 to the nipple 40, the sleeve 50 also moves inwardly in the axial direction together with the one end portion of the hose and, as a result, the inner circumferential portions of the hose present between the ridges 42, 43 and the inward flange 51, and particularly, the portions corresponding to the circumferential grooves 52, 53 are pressed under an intense force by the ridges 42, 43 to be sealed securely and reliably thereby preventing the fluid in the hose from leaking externally.

Furthermore, since the seizure of the inner circumferential portion of the hose due to the ridges 42, 43 and the inward flange 51 can be performed at a sufficient force not only by the selection for the position of the circumferential grooves 52, 53 as described above, but also by increasing the distance W between the end face at the larger diameter portion of the nipple 40 (shoulder 41a) and the seizing surface of the ridge 42 (shoulder 42a) to four times or more than the thickness t of the flange 51, even if the hose 30 undergoes heating and the caulking pressure therefor is reduced, sufficient sealing performance is not damaged. As described above, the distance W is set to four times or more of the flange thickness t, because if it is less than four times, upon forming the circumferential groove 52 to the sleeve 50 within the range, the inward flange 51 will expand to deform toward the one end of the hose 30, as well as the inner end of the flange 51 corrugates circumferentially, so that, in co-operation with the ridge 42, no sufficient seizing force to the one end of the hose 30 is provided.

Figure 6:
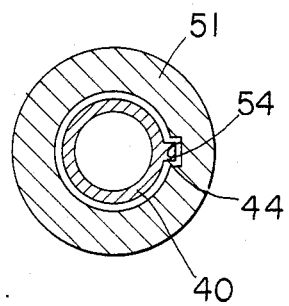
FIG. 6 is a cross sectional view showing the engaging state between the nipple and the inward flange.

In order to prevent the relative rotation between the nipple 40 and the sleeve 50, it is desired to provide a protrusion 44 and a recess 54 engaging to each other at the outer circumference of the nipple 40 and at the inner circumference of the flange 51 respectively, for example, as shown in FIG. 6.

Accordingly, by the illustrated head, a sufficient sealing performance can always be attained to the flexible hose 30 having the synthetic resin layer 20 at least to its inner circumferential surface irrespective of the heating applied thereto.

The result of the test for the hose head according to this invention will be shown in comparison with that for the conventional example shown in FIG. 7.

The flexible hose used in this test is a high pressure hose for use in car cooler having a synthetic resin layer of about 30 $\mu$m thickness to the inner circumferential surface, a bore diameter of 10$\phi$ (thickness of the inner rubber layer 1.8 mm) and spirally reinforced to the two layers. The test conditions are those specified for the heat degradation test according to JASO standards. In this test, the hose is at first maintained for 168 hours in an oven at 120° C., then nitrogen gas is sealed under a pressure of 30 kg/cm$^2$ in the hose and the hose was immersed for five minutes to examine the gas leakage, if any, during the immersion.

TABLE 17

|  | Caulking rate (%) | Leakage |
|---|---|---|
| Conventional hose head (shown in FIG. 7) W = 2 t | 29 | Yes |
|  | 30 | Yes |
|  | 31 | Yes |
|  | 42 | Yes |

TABLE 18

| Hose head of the invention | Caulking rate (%) | Leakage |
|---|---|---|
| Two ridges on the nipple (shown in FIG. 4) W = 12.5 t | 26 | None |
|  | 32 | None |
|  | 36 | None |
|  | 41 | None |
| Single ridge on the nipple (only ridge 42 in FIG. 4) W = 12.5 t | 24 | None |
|  | 29 | None |
|  | 33 | None |
|  | 41 | None |

From the result of the test, it is apparent that the hose head according to this invention is much more excellent than that of the prior art in the sealing performance and, accordinly, cooling medium at high temperature and high pressure can be transported with no leaking and with a sufficient durability irrespective of the caulking rate to the hose.

What is claimed is:

1. A process for producing a tubular rubber product, in which a polyamide resin layer is formed onto an inner circumferential surface, an outer circumferential surface or an intermediate layer of the main body of the tubular rubber product, which comprises:

treating a surface of a main body of the tubular rubber product with a halogenoid compound selected from the group consisting of iodized isocyanate, N,N-dichloroethyl urethane, N,N-dibromoethyl urethane, N,N-dichloropropyl urethane, N,N-dibromopropyl urethane, N,N-dichlorobenzyl urethane, N,N-dibromobenzyl urethane, N,N-dichloro-p-toluene sulfone amide, N,N-dibromotoluene sulfone amide, N,N-dichlorobenzene sulfone amide, N,N-dibromobenzene sulfone amide, tertiary butyl hypohalide, trichloro isocyanuric acid, dichloroisocynauric acid, dibromodimethyl hydantoin, dichlorodimethyl hydantoin, dichloromethylisobutyl hydantoin, and dichloromethylhexyl hydantoin;

coating a solvent solution of a polyamide resin containing an organic solvent-soluble nylon on the surface of the treated tubular rubber product; and evaporating the organic solvent to form a nylon layer.

2. A process for producing a tubular rubber product, in which a polyamide resin layer is formed onto an inner circumferential surface, an outer circumferential surface or an intermediate layer of the main body of the tubular rubber product, which comprises:

treating a surface of a main body of the tubular rubber product with halogenoid compound selected from the group consisting of halogenated isocyanate, N-monohaloalkyl urethane, N,N-dihaloalkyl urethane, N,N-dihaloallysulfone amide, halogenated surfur sulfenil halide, halomethyl ether, thiocyanogen, iodized azid, brominated azide, chrloinated iodine, brominated iodine, trichloro acetic acid iodide, acetic acid bromide, nitric acid iodide, alkyl hypohalide, alkylthionyl chloride, alkylthionyl chloride, chlorinated nitrosyl, brominated nitrosyl, halogenated isocyanuric acid, and halogenated methyl hydantoin;

coating a solvent solution of a polyamide resin containing an organic solvent-soluble nylon on the surface of the treated tubular rubber product; and evaporating the organic solvent to form a nylon layer.

3. The process according to claim 2, wherein the concentration of nylon in solvent is 0.1 to 30% by weight.

4. The process according to claim 2, wherein the rubber constituting the tubular rubber product main body is selected from the group consisting of natural rubber, polyisoprene rubber, polybutadiene rubber, isoprene, butadiene, chloroprene, styrenebutadiene copolymer rubber, vinylpyridine-butadiene-styrene copolymer rubber, acrylonitrile-butadiene copolymer rubber, acrylic acid-butadiene copolymer rubber, methacrylic acid-butadiene copolymer rubber, methyacrylate-butadiene copolymer rubber, acrylonitrile, vinylpyridine, acrylic acid, methacrylic acid, alkyl acrylates, alkyl methacrylates, ethylenepropylenecyclopentadiene ternary copolymer and ethylenepropylene-5-ethylidene-2-norbornane ternary copolymer.

5. The process defined in claim 2, wherein the halogenoid compound is dissolved in an organic solvent and the main body of the tubular rubber product is surface treated with a solvent solution of the halogenoid compound.

6. The process defined in claim 5 wherein the concentration of the halogenoid compound in solvent is 0.1 to 20% by weight.

7. The process defined in claim 2, wherein the organic solvent-soluble nylon is at least one nylon selected from the group consisting of nylon 6, nylon 11, nylon 12, nylon 66 and nylon 610, copolymers and blends thereof, and polyamides thereof in which functional groups are partially modified.

8. The process defined in claim 2, wherein the thickness of the nylon coating layer is less than 500 μm.

9. The process defined in claim 2, wherein the rubber constituting the tubular rubber product main body is selected from the group consisting of natural rubber and synthetic rubbers having carbon-carbon double bonds in the structural formula.

10. The process defined in claim 2, wherein the tubular rubber product has attached at one end portion thereof a hose head, comprising:

a nipple;

a sleeve operatively associated with said nipple;

the outer diameter of the nipple at a first end portion being larger than the outer diameter thereof at a second end portion, at least one ring-like rounded ridge being formed at the outer circumference on the second end portion and each of the rounded ridges having a seizing surface opposing the larger diameter portion and extended in the direction perpendicular to the axial direction of the nipple;

the sleeve having a ring-like inward flange at the first end portion;

the distance between the end face at the larger diameter portion of the nipple and the seizing surface of the ridge is four times or more as large as the thickness of the inward flange; and the nipple being inserted from the second end portion thereof having the ridge into the opening on one end of the flexible hose having the synthetic resin layer at its inner circumference surface, the sleeve being disposed so as to cover the outer circumference at one end portion of the hose so that the inward flange is situated between the larger diameter portion of the nipple and the ridge adjacent therewith and in contact with one end face of the hose, the sleeve being subjected to caulking at a portion between the ridge adjacent with the larger diameter portion of the nipple and one end of the hose, and the inner diameter of the inward flange of the sleeve being smaller than the outer diameter at the top of the ridge of the nipple after caulking.

11. The tubular rubber product produced by the process defined in claim 2.

12. The tubular rubber product produced by the process defined in claim 10.

* * * * *